US006889095B1

(12) United States Patent
Eidson et al.

(10) Patent No.: US 6,889,095 B1
(45) Date of Patent: May 3, 2005

(54) COMPUTER NETWORK ADAPTED FOR INDUSTRIAL ENVIRONMENTS

(75) Inventors: John C. Eidson, Palo Alto, CA (US); Hans Sitte, San Jose, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 983 days.

(21) Appl. No.: 09/096,403

(22) Filed: Jun. 11, 1998

(51) Int. Cl.$^7$ .......................... G05B 11/01; H01L 35/28
(52) U.S. Cl. .......................... 700/12; 700/12; 375/296; 375/242; 375/34 D; 348/13; 136/217
(58) Field of Search .......................... 700/12; 395/296; 348/13, 7; 455/5.1; 710/5; 370/419, 431

(56) References Cited

U.S. PATENT DOCUMENTS

| | | | | |
|---|---|---|---|---|
| 3,914,743 A | * | 10/1975 | Fitch et al. ............ | 340/825.03 |
| 4,509,073 A | * | 4/1985 | Baran et al. ................... | 348/12 |
| 5,590,292 A | * | 12/1996 | Wooten et al. ................. | 710/5 |
| 5,754,941 A | * | 5/1998 | Sharpe et al. ................. | 455/5.1 |
| 5,796,962 A | * | 8/1998 | Fant et al. .................. | 710/126 |
| 5,859,995 A | * | 1/1999 | Hewitt ....................... | 713/400 |
| 5,966,410 A | * | 10/1999 | Freyman et al. ............ | 375/296 |
| 6,002,687 A | * | 12/1999 | Magee et al. ............... | 370/394 |
| 6,081,509 A | * | 6/2000 | Magiros et al. ............. | 370/241 |
| 6,138,199 A | * | 10/2000 | Fleischer | |
| 6,147,682 A | * | 11/2000 | Kim ........................... | 345/211 |
| 6,157,614 A | * | 12/2000 | Pasternak et al. .......... | 370/236 |

* cited by examiner

Primary Examiner—Firmin Backer

(57) ABSTRACT

A network for connecting a plurality of devices and the components used in constructing the network. The network includes at least one fan-out device for connecting the devices to each other. The fan-out device includes a controller, a top port and a plurality of downstream ports. The controller monitors messages received by the ports and generates messages that are sent via the ports. The network also includes a plurality of network cables, one per port. The network preferably utilizes a cabling system that includes twisted pairs for communicating the messages via the Ethernet protocol and power conductors for distributing power to the various network devices. The fan-out device includes one power component associated with each of the ports. Each power component provides connections between the power lines in the network capble and the ports of the fan-out device. The power components are used to power the devices on the network and to monitor the power lines for problems. Switching circuitry in the power components allows the fan-out device to isolate cable runs connected thereto that have shorts or other problems. The fan-out device preferably stores a device identification number that the controller transmits on all of the ports in response to a message received on one of the downstream ports. The controller also generates a signal on the top port that causes any device connected to the fan-out device via the top port to ignore the message. One embodiment of the fan-out device provides a hub that is transparent to Ethernet protocols while not introducing the jitter into the signals associated with the re-transmission and synchronization functions performed by conventional hubs.

49 Claims, 5 Drawing Sheets

COMPUTER NETWORK ADAPTED FOR INDUSTRIAL ENVIRONMENTS

FIELD OF THE INVENTION

The present invention relates to network systems for connecting a plurality of data processing systems, and more particularly, to a network system that is adapted to industrial environments.

BACKGROUND OF THE INVENTION

In many control and monitoring applications one or more field busses are used to establish communication between the various sensors, actuators, controllers and other components typically found at the field level in such systems. Most of these field busses are either proprietary or of limited use outside of rather narrow application areas. There has been considerable interest in using a standard communication protocol such as Ethernet™ in these applications.

Field level communications are typically established among sensors, actuators, controllers, and other devices (nodes) found in factory, industrial, environmental monitoring, agricultural and similar application environments. Unfortunately, applications in industrial settings typically have considerably different environmental, installation, and operational requirements from those found in the office environment where Ethernet™ is the dominant protocol.

First, the devices in an industrial setting are typically powered from conductors that are included in the cable carrying the signal lines. In office settings, individual nodes are powered from local 110 VAC power plugs. If a cable failure occurs in an industrial setting, the entire portion of the network serviced by that cable could be rendered inoperative. The repair of the system may be delayed for some period of time because the industrial environment has hazards that limit the repair staff to technicians who are familiar with the particular plant environment in which the cable is installed. Such failures are less frequent in the office environment since individual nodes are separately powered and repairs are not complicated by safety considerations. Hence, the network components utilized in the office implementations of Ethernet do not provide facilities for containing the failure to allow at least a portion of the network to continue functioning.

Second, office environments typically use systems in a star topology; whereas, industrial environments are better suited to a combination of star and linear topologies. In an office environment, devices are typically connected to a repeater using a star pattern. Such repeaters are normally found in 'wiring closets' that contain other network components such as gateways, access to wide area networks, etc. In industrial environments at the field level, two typical configurations are found. In the first configuration, there are a number of devices located within a relatively close distance. For example, a collection of devices associated with a particular machine or process such as a boiler or packaging machine could be in this configuration. In this case, a network in a star configuration is preferred. In the second configuration, there are a number of devices, or a number of collections of devices, which are relatively sparsely spaced and for which a linear topology is more natural to minimize the wiring costs. A collection of proximity sensors spaced along a conveyor line would be preferably configured in this manner.

Current hubs and 10 baseT systems are limited to star topology. The original Ethernet coaxial system was linear but currently represents a small fraction of the Ethernet installations. In an industrial environment, coax is not favored, as it is more susceptible to damage and degradation due to bending than twisted pair cables.

In principle, a linear topology can be constructed from a plurality of hubs connected together. In practice, however, the number of hubs that can be combined reliably is limited to less than 7. This limitation results from the "signal jitter" introduced by each hub. This jitter is additive; hence, as the number of hubs increases, the jitter increases until the signaling protocols fail. The maximum number of hubs, in general, is not predictable, since this number depends on the specifics of each installation. Hence, to provide a linear topology, a component that combines signals without introducing jitter is needed.

Third, individual nodes are addressed only via their node addresses in Ethernet systems. While address tables are logically sufficient to manage communications, they have a number of problems. For example, the tables are subject to installation errors and are difficult to maintain.

In addition, the information is not easily accessible by components connected to the nodes. The network topology often contains information on the functioning of devices within the network. For example, all of the devices connected to a particular hub may be related to a particular piece of machinery or group of machines that work in concert. If one machine fails, it may be necessary to send messages to the other machines to take action to contain the damage caused by the first machine's failure. This requires the data processing system at the node that detected the failure to send a message to all other devices on the relevant hub. To perform this communication, the sending processor needs to know the addresses of all devices on that hub. This information is not generally easily available to devices attached to the network. Typically only one computer in a large network will have a map of the network, and this computer, is not necessarily programmed to provide that information to a device on a node of the network. Hence, an additional level of address support is needed so that a message can be directed to all devices attached to a hub or similar device without requiring the sender to provide the address of each recipient.

Broadly, it is the object of the present invention to provide an improved network system that is better adapted to industrial environments.

It is a further object of the present invention to provide an industrial network that can function within the Ethernet standard.

It is a still further object of the present invention to provide an industrial network that supports linear topologies.

It is yet another object of the present invention to provide an industrial network that is capable of containing cable failures so that at least a portion of the network serviced by the cable can continue to function.

It is another object of the present invention to provide an industrial network in which devices can be addressed with reference to the network topology.

These and other objects of the present invention will become apparent to those skilled in the art from the following detailed description of the invention and the accompanying drawings.

SUMMARY OF THE INVENTION

The present invention is a network for connecting a plurality of devices and the components used in constructing the network. A network according to the present invention includes at least one fan-out device for connecting the devices. The fan-out device includes a top port and a plurality of downstream ports. The fan-out device also includes a controller for monitoring messages received by the ports and for generating messages to be sent via the ports. A first signal combining circuit in the fan-out device generates an upstream combined message including messages generated by the controller for the top port and messages received by the downstream ports. The upstream combined message is transmitted from the top port. The fan-out device also includes a second signal combining circuit for generating a downstream combined message that includes messages generated by the controller for the downstream ports and messages received by the top port. The downstream combined message is transmitted from the downstream ports. The network also includes a plurality of network cables, one per port, for communicating messages to and from the devices. The signal combining circuits are preferably summing amplifiers. In the preferred embodiment of the present invention, the network cable includes twisted pairs for communicating the messages via the Ethernet protocol and first and second power conductors. Alternate embodiments can be designed which combine the signaling and power function is a single pair of wires.

In the preferred embodiment of the present invention, the fan-out device further comprises a plurality of power components, one such power component being associated with each of the ports. Each power component is connected to the first and second power conductors of the network cable connected to the port associated with that power component. The fan-out device is powered by power received by one of the power components, usually the power component associated with the top port. Each of the power components also includes a circuit for detecting a predetermined condition on the first and second power conductors connected to the power component and for generating a signal indicative of the existence of the condition. In addition, each of the power components includes a switching circuit for disconnecting the first and second power conductors in the network cable connected to the port associated with the power component from the fan-out device upon detection of the predetermined condition. When the predetermined condition is detected, the controller also generates and sends a message indicating that the predetermined condition was detected via the top port.

In another embodiment of the invention, the network cable includes first and second signal conductors and the fan-out device further includes a plurality of signal line monitoring components for detecting problems in the signal conductors and isolating the signal conductors when problems are detected. One such signal line monitoring component is associated with each of the ports and is connected to the first and second signal conductors of the network cable connected to the port associated with that signal line monitoring component. Each of the signal line monitoring components includes a circuit for detecting a predetermined condition on the first and second signal conductors connected to the signal line monitoring component and for generating a signal indicative of the existence of the condition. In addition, each of the signal line monitoring components includes a switching circuit for disconnecting the first and second signal conductors in the network cable connected to the port associated with the signal line monitoring component from the fan-out device. The controller generates and transmits an error message indicating that the predetermined condition was detected via the top port.

In the preferred embodiment of the present invention, the fan-out device further includes a circuit for storing a device identification number. The controller generates and transmits an identification message containing the device identification number via the top and downstream ports in response to a message received on one of the downstream ports. The controller also generates a signal on the top port that causes any device connected to the fan-out device via the top port to ignore the message. The identification message may also include information specifying which port on the fan-out device received the request message.

A fan-out device according to the present invention may be constructed from summing amplifiers and line receivers in such a manner that the device is transparent to Ethernet protocols while not introducing the jitter into the signals associated with the re-transmission and synchronization functions performed by conventional hubs.

DETAILED DESCRIPTION OF THE INVENTION

Figure 1:
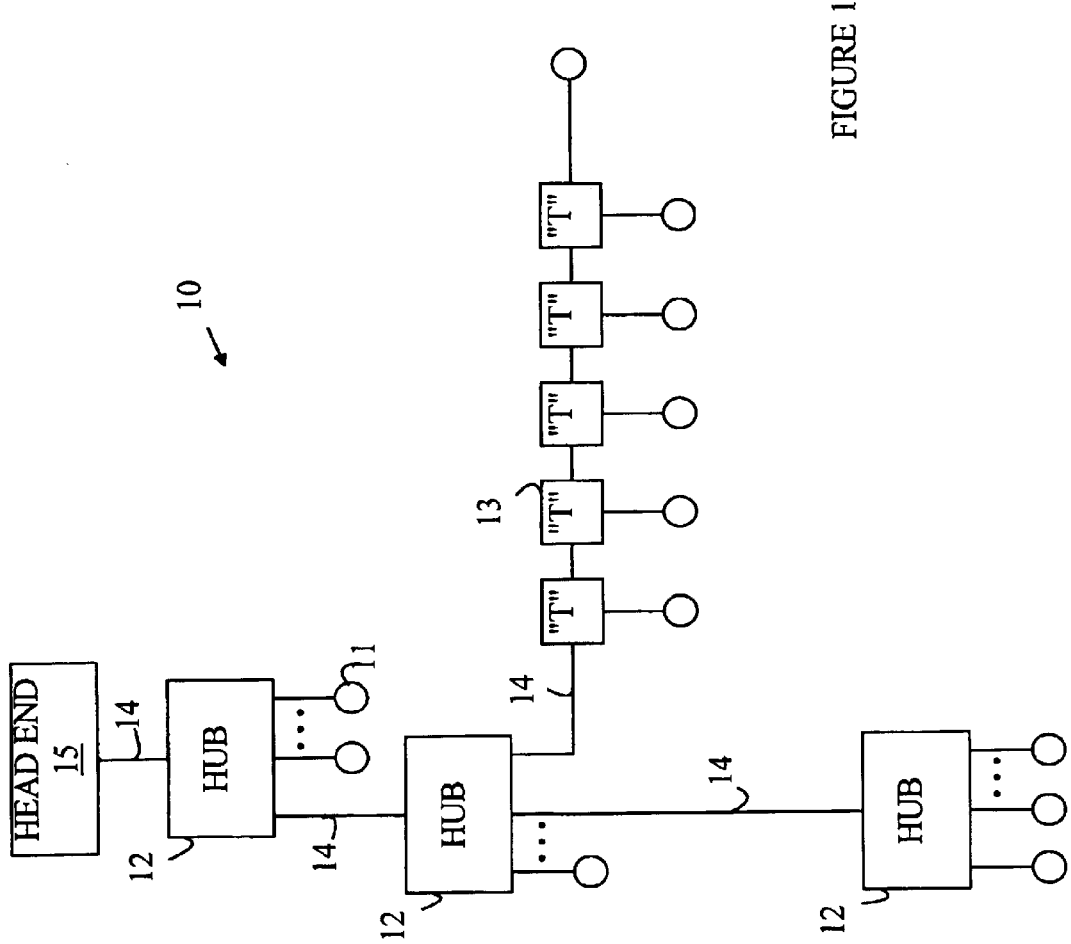
FIG. 1 is a block diagram of a network according to the present invention.

Refer now to FIG. 1 which is a block diagram of a network 10 according to the present invention for connecting a number of devices 11 to each other and to a head end 15 which is typically a server. Network 10 is constructed from a cable system 14 and two types of fan-out devices. Cable system 14 is based on twisted pairs for signal transmission; hence, the individual devices 11 must be connected via some form of fan-out device. The first type of fan-out device will be referred to as a hub. Hubs are shown at 12 in FIG. 1. A hub amplifies the signals, resynchronizes, and retransmits the amplified signals. As noted above, there is a limit to the number of hubs that can be connected in series, since the re-transmission function of each hub introduces "jitter" into the signals output therefrom.

To overcome the limit on the number of hubs that can be connected in series, the present invention utilizes a second type of fan-out device, referred to as a "T". Exemplary Ts are shown at 13. A T may be viewed as hub having a fan-out of 2 that only amplifies the signals. That is, a T does not provide the resynchronization and retransmission function normally associated with a hub, and hence is transparent to the Ethernet protocol. Accordingly, a T does not introduce significant jitter into the signals passing therethrough. Hence, Ts are not nearly as limited in the number of such devices that can be connected in series. For Ts which are properly designed to account for the impedance and transmission properties of the signaling wire, the limit on the number of Ts that can be connected in series is determined by the total length of wire allowed between the last conventional repeater (i.e., retransmitting device) and the end device less the effective electrical length of the Ts (based on their internal delays). Such delays are usually negligible;

hence, the number of Ts that can be connected in series is significantly greater than the number of hubs that can be connected in series.

Figure 2:
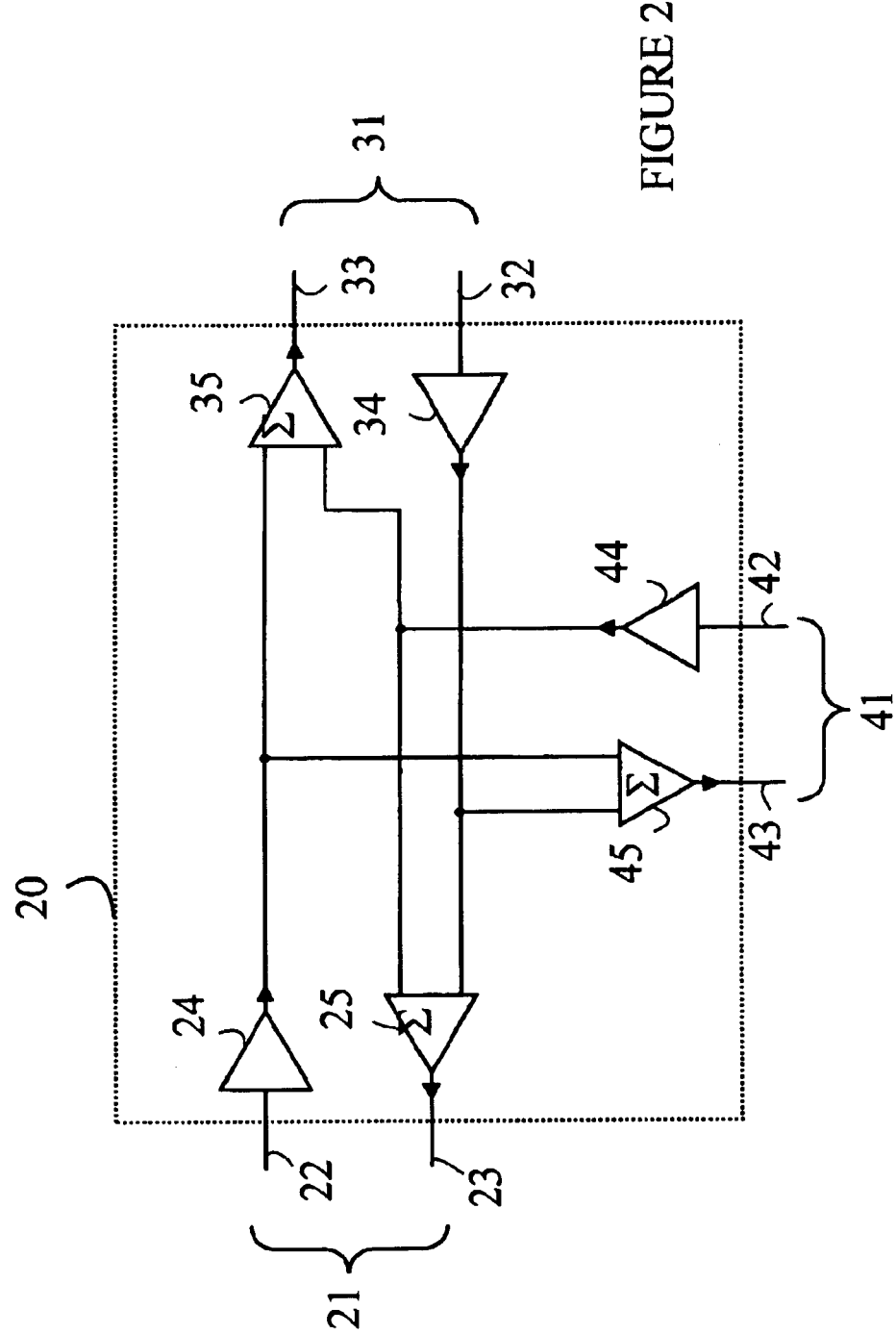
FIG. 2 is a schematic drawing of the simplest embodiment of a fan-out device according to the present invention.

The manner in which a T functions can be more easily understood with reference to FIG. 2. FIG. 2 is a schematic drawing of the simplest embodiment of a T according to the present invention. T 20 has three ports, labeled 21, 31, and 41. Consider port 21. The inbound signal line 22 is connected to a line-receiving amplifier 24. Outbound signal line 23 is connected to a summing amplifier 25 whose inputs are the outputs of the line-receiving amplifiers from the other ports in the T, i.e., amplifiers 34 and 44. The other ports function in the analogous manner. Port 31 amplifies the signal received on inbound line 32 via amplifier 34 and constructs an output signal on line 33 by summing the outputs of amplifiers 24 and 44 in amplifier 35. Similarly, port 41 amplifies the signal received on inbound line 42 via amplifier 44 and constructs an output signal on line 43 by summing the outputs of amplifiers 24 and 34 in amplifier 45.

It will be obvious to those skilled in the art from the preceding discussion that fan-out devices having a fan-out of more than 2 may be constructed in a manner analogous to that described above with respect to T 20. Each port of the fan-out device would have a line amplifier to amplify the signals on the input line associated with that port. Each port would also have a summing amplifier for constructing an output signal to be transmitted on the ports output line. The summing amplifier would have the outputs of the line amplifiers not associated with that port as its inputs.

The T discussed above will appear to the device transmitting to a port as just a length of cable provided only a single message is being transmitted in the system. If two devices attached to the T attempt to simultaneously transmit a packet, the Ethernet protocol requires that a "collision" signal be placed on the network. The collision signal should be generated by the two components transmitting into ports as they both see their own as well as the second signal. However, embodiments of the present invention in which the T generates the collision signal may also be utilized. An alternative to generating a collision signal is to force a CRC error.

Figure 3:
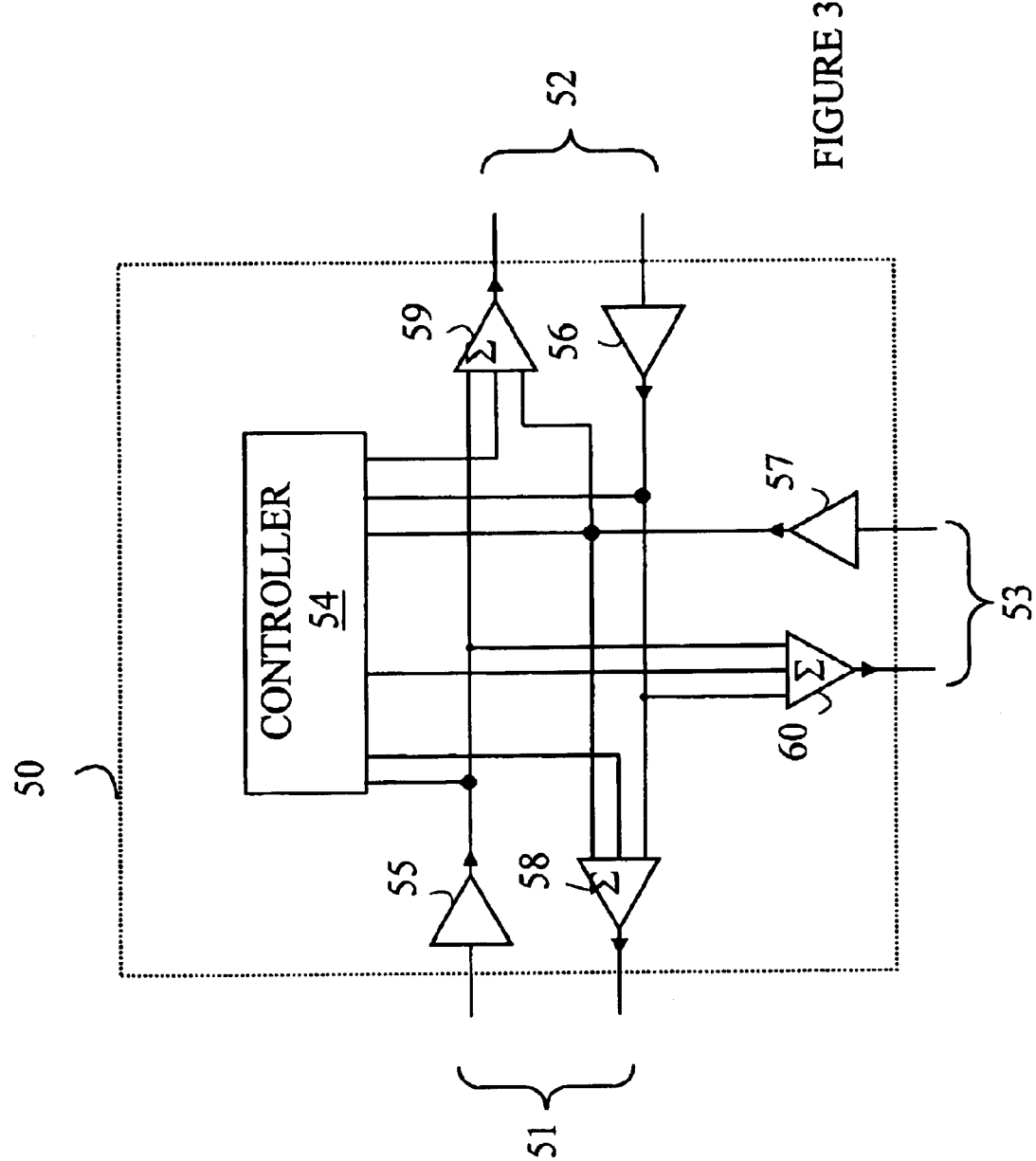
FIG. 3 is a schematic drawing of another embodiment of a fan-out device according to the present invention.

Refer now to FIG. 3, which is a block diagram of another embodiment of a T according to the present invention. T 50 has input ports 51, 52, and 53. It differs from T 20 in that it also includes a controller 54, which receives signals from each of the line amplifiers 55–57. Controller 54 also generates output signals that are coupled to the various ports via summing amplifiers 58–60. Controller 54 includes circuitry for detecting the simultaneous presence of a packet or carrier signal on two or more ports. When this condition is detected, controller 54 generates and transmits the collision signal. The detection is preferably performed in the same manner used in conventional Ethernet implementations. Hence, T 50 is completely transparent to the nodes that are connected to its ports.

The circuits in the T and hub components used in a network according to the present invention require power. In principle, the power could be provided from a local power source in the same manner as utilized with conventional hubs in Ethernet systems. As noted above, industrial environments do not always lend themselves to local power sources. Hence, in the preferred embodiment of the present invention, the network cabling also includes conductors for transmitting power. The conductors can transmit either AC or DC power. AC power has two advantages. First, polarity is not an issue. Second, ground isolation for the components may be implemented with simple transformers.

In the preferred embodiment of the present invention the fan-out components include power components that couple and/or manage the power distribution system. The power components will be discussed with reference to a T such as that discussed above with reference to FIG. 3. However, it will be obvious to those skilled in the art from the following discussion that such power components can also be included in other network elements.

Figure 4:
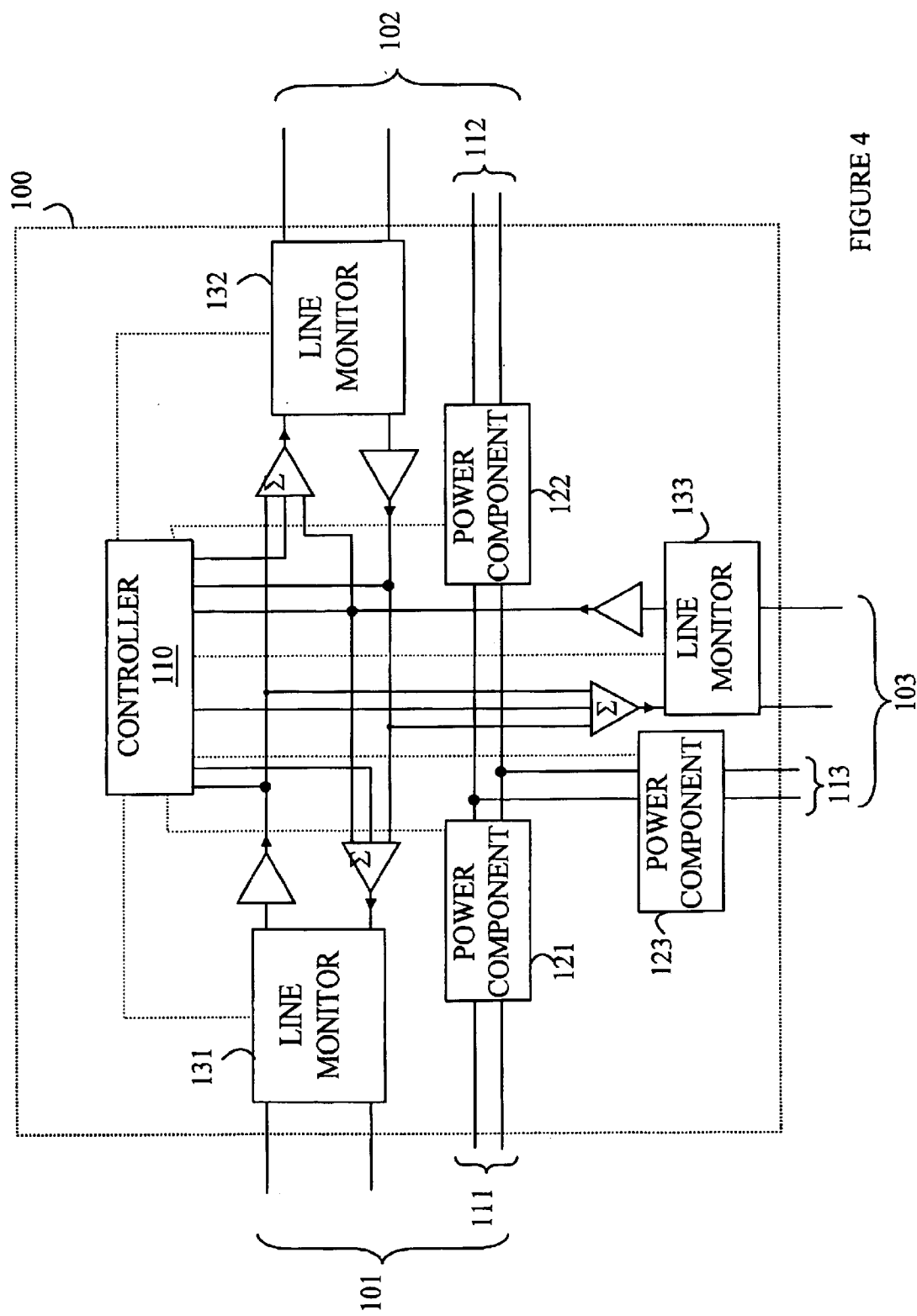
FIG. 4 is a schematic drawing of a third embodiment of a fan-out device according to the present invention.

Refer now to FIG. 4, which is a schematic drawing of a T 100 which includes components for extracting power and managing the power distribution network. Each of the ports 101–103 includes a power component for coupling the power conductors shown at 111–113, respectively to T 100. The power component corresponding to ports 101–103 are shown at 121–123, respectively. The connections between the power components and the various amplifiers have been omitted to simplify the figure. In addition, it is assumed that controller 110 is also powered by one of the power components. In general, it will be the power component on the top port that provides the power for the T.

In the simplest embodiment, each power component is a transformer, and controller 110 or the amplifiers themselves include the necessary circuitry for converting the AC power to the logic levels needed by the components.

As noted above, industrial environments often involve long network lines that are subject to damage. In addition, any device that is connected to the power lines can, in principle, develop a short that can take down the entire power system. Hence, in the preferred embodiment of the present invention, each power component includes additional circuitry to detect failures and switching circuitry to isolate the portion of the power line that has shorted. For example, each power component may include circuitry for measuring the load seen at the port associated with that power component and switching circuitry that allows the power at that port to be isolated. In such embodiments, controller 110 includes power management functions. Controller 110 preferably senses the load at each port to determine if any abnormality exists, e.g. an open circuit, a short circuit, or other some other defined abnormality. Upon detecting such an abnormality, controller 110 isolates the power. Controller 110 may also send a signal to and from the abnormal port to prevent the abnormality from disturbing the rest of the system. In addition, controller 110 can provide a visual indication identifying the port associated with the abnormality to aid maintenance personnel.

A similar arrangement may be employed to sense problems in the signal carrying conductors of the network cable. In embodiments employing this feature, each port includes a line monitor under the control of controller 110 that monitors the impedance of the signal carrying conductors. The line monitors corresponding to ports 101–103 are shown at 131–133, respectively. The line monitors may also include switching circuitry for isolating portions of the lines in which an abnormality exists thereby preventing the abnormality from disturbing the rest of the signal-transmitting portion of the network.

Since such failures are anticipated events, controller 110 can be programmed to send a "canned" message from the functional ports reporting the existence and location of the detected fault. In this case, controller 110 includes an identification number that identifies the component in which controller 110 is located as part of the message in the preferred embodiment of the present invention. Accordingly, a network component according to the present invention preferably includes a unique identifier to be included in such messages.

It should be noted that in a network according to the present invention, the faults are known to be downstream of the segment connected to the port at which the fault was detected. If the fault were beyond the immediate segment, it would have been detected in the next component instead. Such a system for isolating and signaling the presence of faults greatly increases the maintainability of Ethernet networks in the industrial environment.

Figure 5:
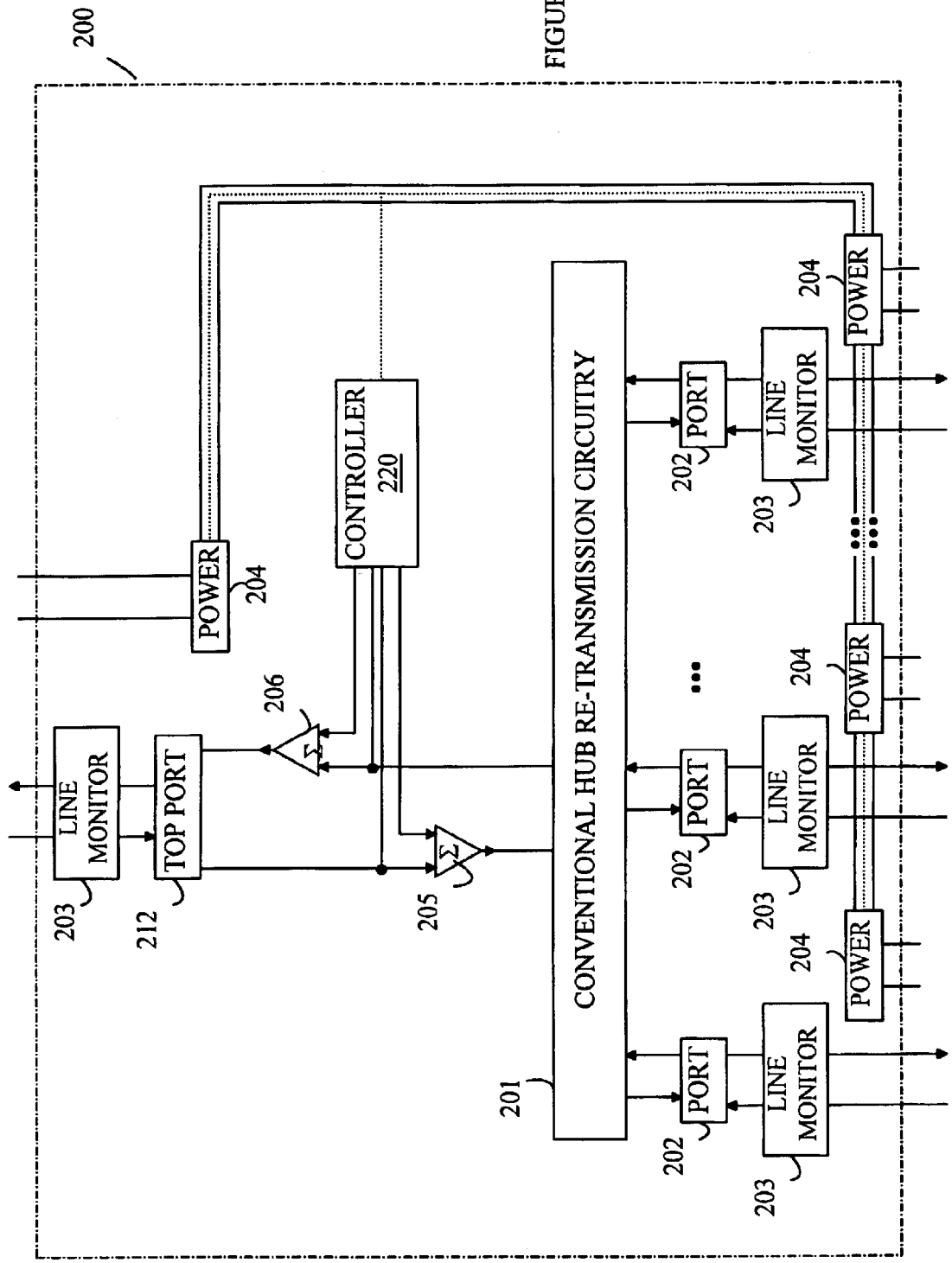
FIG. 5 is a schematic drawing of a fan-out device according to the present invention that incorporates the functionality of a conventional Ethernet hub.

The network management and power distribution functions described above with reference to Ts can be included in conventional Ethernet hubs and similar devices to provide the advantages described above to these devices. The manner in which this is accomplished may be more easily understood with reference to FIG. 5, which is a schematic diagram of a hub 200 according to the present invention. Hub 200 includes the re-transmission circuitry 201 found in conventional hubs for interfacing the various conventional ports 202 to each other. One of the conventional ports is defined to be top port 212 that defines the upstream direction. The remaining ports are the downstream ports. While the above described embodiments of fan-out device according to the present invention did not specifically define one of the ports as the "top port". However, it will be obvious to those skilled in the art that any of the ports can be connected to the upstream portion of the network, i.e., the portion nearest to the head end. This port then becomes the "top port". The conventional hub circuitry will not be discussed further, as it functions in the conventional manner. Hub 200 also includes a controller 220 that monitors the signals received on each port and generates signals for transmission through the ports.

The signals generated by controller 220 are introduced into the communication stream with the aid of summing amplifiers 205 and 206. Since Ethernet protocols do not permit hubs to store and forward, a packet generated by controller 220 must be transmitted through all of the ports. For messages generated by the controller 220 which should be processed only by devices attached to the bottom ports, controller 220 generates a "collision" or an error transmission signal that causes a checksum error to be generated by devices connected to the top port. As noted above, this signal will cause all of the receivers listening to the top port to discard this packet. A similar mechanism can be utilized to preclude downstream devices from processing a message while allowing a top connected device to process the message correctly.

In embodiments which provide power and power management, power components 204 under the control of controller 220 are utilized in a manner analogous to that described above. The connections between the power components and the various amplifiers and other circuitry in hub 200 have been omitted to simplify the drawing. Similarly line monitors 203 under the control of controller 220 may be introduced to monitor and manage the communication network in a manner analogous to that described above.

As discussed above, conventional Ethernet networks address the network components via address tables. A first device wishing to send a message to a second device on the network must know the address of the receiving device so that it can address a message to that device. This requires each device to keep track of the addresses of all devices to which it might need to send a message. Since network topologies are seldom fixed for all times, the address tables for such devices must be periodically updated. This process complicates the management of the network. Further, the addition of a new device at a hub can require software changes in numerous other devices further complicating network management.

The present invention provides a new method for addressing messages that overcomes many of these problems. Since this aspect of the present invention is common to all network interface devices according to the present invention, the following discussion will assume that the relevant device is a hub. However, it will be obvious to those skilled in the art from the following discussion that the same methodology applies to Ts and other components.

Consider the case in which all devices at a particular hub are to be addressed by a device that may be one of the devices at the hub or a remote device. If a device knows the identification number of the hub to which it is attached, then the device can properly interpret a message addressed to all devices connected to the hub having an identification number contained in the message. In the present invention, all of the devices attached to a hub according to the present invention can determine the identification number of the hub by sending a special message that is recognized by the controller in the hub. The controller defines an upstream and downstream direction for the hub. When it receives a message from the downstream direction requesting the hub's identification number, the controller responds by sending a message which includes its identification number to all downstream ports.

It should be noted that in the case of a hub or similar device, the controller cannot prevent the message from propagating in the upstream direction as well. However, the controller prevents the message from being acted upon by the device in the upstream direction by generating a collision signal on the top port. Hence, any upstream device receiving the message will discard it as being corrupted.

This method of preventing other devices from reading the message can be applied selectively to any port. Hence, when the controller detects a special message from port x, it can respond to that message by sending a response that propagates out to all of the ports while generating a collision signal on all ports except port x. Accordingly, the device connected to port x can also receive a message directed only to it by the controller. This type of message allows each port to determine its position on the hub by requesting both the hub identification information and its port number on that hub. A similar mechanism can be utilized to allow a device to provide its own unique identification in its request to the controller. If this identification is included in the response, then other devices may ignore the information. This mechanism requires a more complex controller, since the controller must parse the request for content, i.e. the identification, rather than just the message type. Accordingly, a device connected to a hub can generate a second address for itself that depends only on the topology of the network. This address will be referred to as the device's "topological address" in the following discussion.

Once a device knows its topological address, it can respond to commands that are addressed via this new address. This feature allows any device to address messages to all devices attached to a specific hub or the device attached to a specific port on the hub without the need to store the Ethernet addresses of the individual devices on that hub.

It should be noted that the controller in a hub or similar device according to the present invention could be viewed as a separate device connected to an internal "port" of the device. Hence, the controller can also request its topological address from the device connected upstream of the device in which it is located. Accordingly, the topological addressing scheme can provide the basis for any device to determine not only its "parent", but also its grandparent, great grandparent, etc. Hence, the topological addressing scheme of the present invention allows devices to respond to commands directed to any device at any level of a device's "family tree".

Various modifications to the present invention will become apparent to those skilled in the art from the foregoing description and accompanying drawings. Accordingly, the present invention is to be limited solely by the scope of the following claims.

What is claimed is:

1. A network for connecting a plurality of devices, said network comprising:
   a fan-out device comprising a top port and a plurality of downstream ports, said fan-out device comprising:
   a controller for monitoring messages received by said ports and for generating messages to be sent via said ports;
   a first signal combining circuit for generating an upstream combined message comprising messages generated by said controller for said top port and messages received by said downstream ports, said upstream combined message being transmitted from said top port; and
   a second signal combining circuit for generating a downstream combined message comprising messages generated by said controller for said downstream ports and messages received by said top port, said downstream combined message being transmitted from said downstream ports; and
   a network cable connected to said top port and each of said downstream ports for communicating messages to and from said devices.

2. The network of claim 1 wherein said first signal combining circuit comprises a summing amplifier.

3. The network of claim 1 wherein said fan-out device conforms to the Ethernet standard for sending messages between said devices.

4. The network of claim 1 wherein said network cable comprises a twisted pair for communicating said messages.

5. The network of claim 1 wherein said network cable further comprises first and second power conductors.

6. The network of claim 5 wherein said fan-out device further comprises a plurality of power components, one such power component being associated with each of said ports, each power component being connected to said first and second power conductors of said network cable connected to said port associated with that power component, said fan-out device being powered by power received by one of said power components.

7. The network of claim 5 wherein said fan-out device is powered by said power component associated with said top port.

8. The network of claim 5 wherein each of said power components further comprises a circuit for detecting a predetermined condition on said first and second power conductors connected to said power component and for generating a signal indicative of the existence of said condition.

9. The network of claim 8 wherein each of said power components further comprises a switching circuit for disconnecting said first and second power conductors in said network cable connected to said port associated with said power component from said fan-out device.

10. The network of claim 8 wherein said controller generates and transmits a first error message indicating that said predetermined condition was detected, said message being sent via said top port.

11. The network of claim 5 wherein said network cable comprises first and second signal conductors and said fan-out device further comprises a plurality of signal line monitoring components, one such signal line monitoring component being associated with each of said ports, each signal line monitoring component being connected to said first and second signal conductors of said network cable connected to said port associated with that signal line monitoring component.

12. The network of claim 11 wherein each of said signal line monitoring components further comprises a circuit for detecting a predetermined condition on said first and second signal conductors connected to said signal line monitoring component and for generating a signal indicative of the existence of said condition.

13. The network of claim 12 wherein each of said signal line monitoring components further comprises a switching circuit for disconnecting said first and second signal conductors in said network cable connected to said port associated with said signal line monitoring component from said fan-out device.

14. The network of claim 12 wherein said controller generates and transmits a first error message indicating that said predetermined condition was detected, said message being sent via said top port.

15. The network of claim 1 wherein said fan-out device further comprises a circuit for storing a device identification number and wherein said controller generates and transmits an identification message containing said device identification number via said top and downstream ports, said controller further generating a signal on said top port that causes any device connected to said fan-out device via said top port to ignore said message.

16. The network of claim 15 wherein said identification message is generated in response to a request message received on one of said downstream ports.

17. The network of claim 16 wherein said identification message also includes information specifying which port on said fan-out device received said request message.

18. A fan-out device comprising a top port and a plurality of downstream ports, said fan-out device comprising:
   a controller for monitoring messages received by said ports and for generating messages to be sent via said ports;
   a first signal combining circuit for generating an upstream combined message comprising messages generated by said controller for said top port and messages received by said downstream ports, said upstream combined message being transmitted from said top port; and
   a second signal combining circuit for generating a downstream combined message comprising messages generated by said controller for said downstream ports and messages received by said top port, said downstream combined message being transmitted from said downstream ports.

19. The fan-out device of claim 18 wherein said first signal combining circuit comprises a summing amplifier.

20. The fan-out device of claim 18 wherein said fan-out device conforms to the Ethernet standard for sending messages between devices connected to said ports.

21. The fan-out device of claim 18 wherein said fan-out device further comprises a plurality of power components, one such power component being associated with each of said ports, each power component being connected to first and second power terminals associated with that port, said fan-out device being powered by power received by one of said power components for connecting said power component to first and second power conductors.

22. The fan-out device of claim 21 wherein said fan-out device is powered by said power component associated with said top port.

23. The fan-out device of claim 21 wherein each of said power components further comprises a circuit for detecting a predetermined condition on said first and second power terminals connected to said power component and for generating a signal indicative of the existence of said condition.

24. The fan-out device of claim 23 wherein each of said power components further comprises a switching circuit for isolating said first and second power terminals.

25. The fan-out device of claim 23 wherein said controller generates and transmits a first error message indicating that said predetermined condition was detected, said message being sent via said top port.

26. The fan-out device of claim 18 wherein said fan-out device further comprises a plurality of signal line monitoring components, one such signal line monitoring component being associated with each of said ports, each signal line monitoring component having said first and second signal terminals for receiving messages on said port associated with that signal line monitoring component.

27. The fan-out device of claim 26 wherein each of said signal line monitoring components further comprises a circuit for detecting a predetermined condition on said first and second signal terminals and for generating a signal indicative of the existence of said condition.

28. The fan-out device of claim 27 wherein each of said signal line monitoring components further comprises a switching circuit for isolating said first and second signal terminals.

29. The fan-out device of claim 26 wherein said controller generates and transmits a second error message indicating that said predetermined condition was detected, said message being sent via said top port.

30. The fan-out device of claim 18 wherein said fan-out device further comprises a circuit for storing a device identification number and wherein said controller generates and transmits an identification message containing said device identification number via said top and downstream ports, said controller further generating a signal on said top port that causes any device connected to said fan-out device via said top port to ignore said message.

31. The fan-out device of claim 30 wherein said identification message is generated in response to a request message received on one of said downstream ports.

32. The fan-out device of claim 31 wherein said identification message also includes information specifying which port on said fan-out device received said request message.

33. A fan-out device comprising a top port and a plurality of downstream ports, said fan-out device comprising:
  a plurality of summing circuits, one said summing circuit being associated with each of said ports; and
  a plurality of signal receiving circuits, one of said signal receiving circuits being associated with each of said ports, wherein each of said summing circuits generates a signal comprising the sum of all of the signals received by said signal receiving circuits that are not associated with that port.

34. The fan-out device of claim 33 further comprising:
  a controller for monitoring messages received by said ports and for generating a message to be sent via said ports, said generated message being sent by coupling said message to one of said summing circuits.

35. The fan-out device of claim 34 wherein said controller generates a collision message on all of said ports when said controller detects the simultaneous presence of two inbound messages to said fan-out device.

36. The fan-out device of claim 33 wherein said signal summing circuits comprise a summing amplifier.

37. The fan-out device of claim 34 wherein said fan-out device conforms to the Ethernet standard for sending messages generated by said controller.

38. The fan-out device of claim 34 wherein said fan-out device further comprises a plurality of power components, one such power component being associated with each of said ports, each power component being connected to first and second power terminals associated with that port, said fan-out device being powered by power received by one of said power components.

39. The fan-out device of claim 38 wherein said fan-out device is powered by said power component associated with said top port.

40. The fan-out device of claim 38 wherein each of said power components further comprises a circuit for detecting a predetermined condition on said first and second power terminals connected to said power component and for generating a signal indicative of the existence of said condition.

41. The fan-out device of claim 40 wherein each of said power components further comprises a switching circuit for isolating said first and second power terminals.

42. The fan-out device of claim 40 wherein said controller generates and transmits a first error message indicating that said predetermined condition was detected, said message being sent via said top port.

43. The fan-out device of claim 34 wherein said fan-out device further comprises a plurality of signal line monitoring components, one such signal line monitoring component being associated with each of said ports, each signal line monitoring component having said first and second signal terminals for receiving messages on said port associated with that signal line monitoring component.

44. The fan-out device of claim 43 wherein each of said signal line monitoring components further comprises a circuit for detecting a predetermined condition on said first and second signal terminals and for generating a signal indicative of the existence of said condition.

45. The fan-out device of claim 44 wherein each of said signal line monitoring components further comprises a switching circuit for isolating said first and second signal terminals.

46. The fan-out device of claim 44 wherein said controller generates and transmits a second error message indicating that said predetermined condition was detected, said message being sent via said top port.

47. The fan-out device of claim 34 wherein said fan-out device further comprises a circuit for storing a device identification number and wherein said controller generates and transmits an identification message containing said device identification number via said top and downstream ports, said controller further generating a signal on said top port that causes any device connected to said fan-out device via said top port to ignore said message.

48. The fan-out device of claim 47 wherein said identification message is generated in response to a request message received on one of said downstream ports.

49. The fan-out device of claim 48 wherein said identification message also includes information specifying which port on said fan-out device received said request message.

* * * * *